United States Patent [19]
Yoshida

[11] Patent Number: 4,631,488
[45] Date of Patent: Dec. 23, 1986

[54] QAM DEMODULATOR WITH DISTORTION COMPENSATION

[75] Inventor: Yasuharu Yoshida, Tokyo, Japan

[73] Assignee: NEC Corporation, Tokyo, Japan

[21] Appl. No.: 804,426

[22] Filed: Dec. 4, 1985

[30] Foreign Application Priority Data

Dec. 10, 1984 [JP] Japan .................................. 59-260374

[51] Int. Cl.$^4$ ............................................... H03D 3/18
[52] U.S. Cl. .......................................... 329/50; 375/39
[58] Field of Search ......................... 329/50, 122, 124; 375/39, 80, 81

[56] References Cited

U.S. PATENT DOCUMENTS 4,255,713  3/1981  Yoshida ........................... 329/124 X

*Primary Examiner*—Eugene R. Laroche
*Assistant Examiner*—D. C. Mis
*Attorney, Agent, or Firm*—Sughrue, Mion, Zinn, Macpeak & Seas

[57] ABSTRACT

A demodulator for demodulating a QAM signal which is usable in combination with an adaptive transversal equalizer. Controls over the demodulator and the equalizer are each converged to an optimum point so that the sampling points of two analog-to-digital converters of the demodulator are optimally controlled. For a limited occupied bandwidth of a carrier passband, a large amount of data may be transmitted with distortions due to delay and attenuation inherent in a transmission path compensated for.

8 Claims, 11 Drawing Figures

QAM DEMODULATOR WITH DISTORTION COMPENSATION

BACKGROUND OF THE INVENTION

The present invention reltates to a demodulator and, more particularly, to a demodulator for demodulating a quadrature-amplitude modulated signal.

A quadrature-amplitude modulation (QAM) system features a unique capability of transmitting a large amount of data per unit frequency of the occupied bandwidth of a carrier passband and, for this reason, it has been extensively used for large capacity radio communications in which the occupied frequency bandwidth is severely restricted. A prior art demodulator for demodulating a QAM signal includes an orthogonal detector which detects a four-phase modulated signal, which is one of QAM signals, to produce two demodulated signals, and two analog-to-digital (AD) converters which discriminate respectively the two demodulated signals responsive to a clock to produce two different data signals each. The data signals from one of the AD converters and the clock are applied to a control circuit which then generates a control signal. A voltage controlled oscillator (VCO) oscillates the clock having a frequency which is controlled by the control signal. Of the two data signals outputted by each of the AD converters, at least one serves as an error signal representative of a deviation of the value of the associated demodulated signal at a sampling point of the AD converter from a normal value (normal level).

In a demodulator designed for use with QAM signals, the influence of insignificant deviations of the sampling point may be compensated for by use of an adaptive transversal equalizer of the type described in, for example, Papers dedicated to The 1984 National Meeting of The Communications Section of The Institute of Electronics and Communication Engineers of Japan, Fascicle 3 (1984-10), pp. 3-23 and 24. An adaptive transversal equalizer is capable of compensating for distortions due to delay and attenuation in a transmission path by automatic control and in conformity to particular conditions of the transmission path. The tap constant of such a special equalizer is determined by use of the previously mentioned error signal.

Where the prior art demodulator is used in combination with an adaptive transversal equalizer, the above-stated error signal bifunctions as an error signal adapted to control a clock synchronizing circuit of the demodulator and an error signal adapted to control the equalizer. In such a condition, a control loop associated with the demodulator and a control loop associated with the equalizer affect each other to become astatic, the equalizer significantly deteriorating the demodulation eye pattern. Stated another way, should the prior art demodulator be used together with an adaptive transversal equalizer, the control over the demodulator and that over the equalizer might each be prevented from converging to the optimum point.

SUMMARY OF THE INVENTION

It is therefore an object of the present invention to provide a modulator which is free from the above-described drawback and operable normally even if used with an adaptive transversal equalizer.

It is another object of the present invention to provide a generally improved demodulator.

A demodulator for demodulating a quadrature-amplitude modulated signal of the present invention comprises an othogonal detector for detecting the quadrature-amplitude modulated signal to produce a first and a second demodulated signals, a first clock generator for regenerating a signal which is synchronous to a clock out of transition points of the quadrature-amplitude modulated signal or the first demodulated signal, a first phase shifter for shifting a phase of an output signal of the first clock generator to produce a first clock signal, a first analog-to-digital converter for discriminating the first demodulated signal responsive to the first clock signal to produce a first group of data signals, a second clock generator for producing a second clock signal a frequency or a phase of which is controlled by a control signal, a second analog-to-digital converter for discriminating the second demodulated signal responsive to the second clock signal to produce a second group of data signals, and a control circuit for gating and logically processing the second group of data signals to produce the control signal.

In accordance with the present invention, a demodulator for demodulating a QAM signal which is usable in combination with an adaptive transversal equalizer is provided. Controls over the demodulator and the equalizer are each converged to an optimum point so that the sampling points of two analog-to-digital converters of the demodulator are optimumly controlled. For a limited occupied bandwidth of a carrier passband, a large amount of data may be transmitted with distortions due to dealy and attenuation inherent in a transmission path compensated for.

The above and other objects, features and advantages of the present invention will become more apparent from the following detailed description taken with the accompanying drawings.

BREIF DESCRIPTION OF THE DRAWINGS

DESCRIPTION OF THE PREFERRED EMBODIMENTS

While the demodulator of the present invention is susceptible of numerous physical embodiments, depending upon the environment and requirements of use, substantial numbers of the herein shown and described embodiments have been made, tested and used, and all have performed in an eminently satisfactory manner.

To better understand the present invention, a brief reference will be made to a prior art demodulator, shown in FIG. 1.

Figure 1:
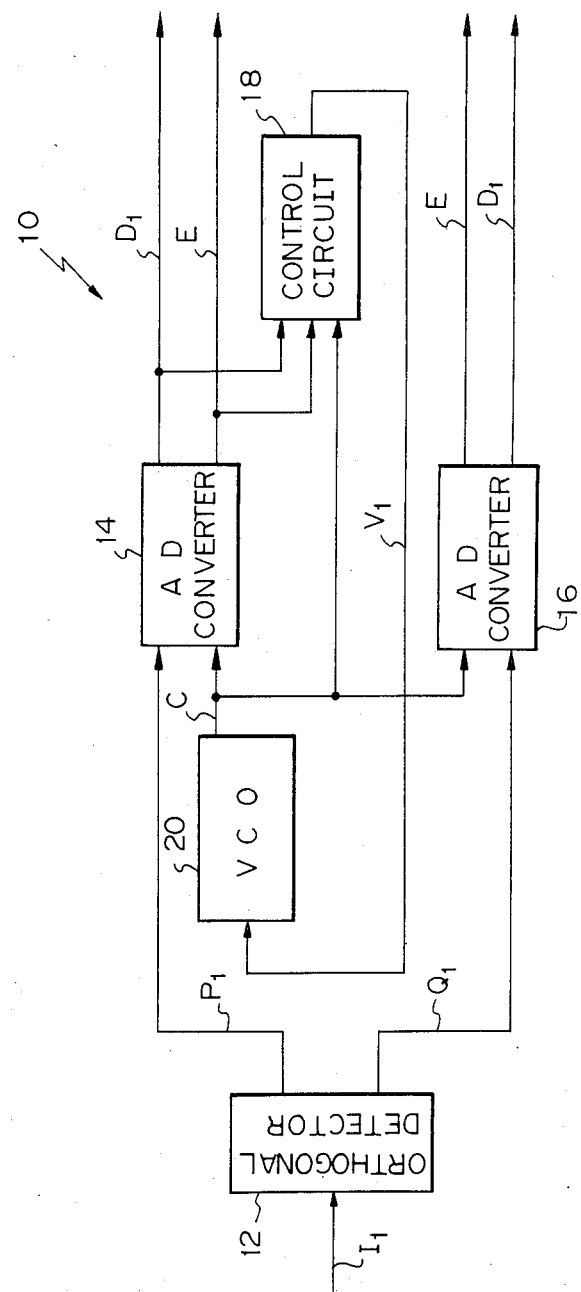
FIG. 1 is a block diagram showing a prior art demodulator.

In FIG. 1, a prior art demodulator, generally 10, includes an orthogonal detector 12 for detecting a four-phase modulated signal $I_1$ to produce two-level demodulated signals $P_1$ and $Q_1$. Two-bit analog-to-digital (AD) converters 14 and 16 discriminate respectively the demodulated signals $P_1$ and $Q_1$ each responsive to a clock C, thereby each producing two data signals $D_1$ and E. The outputs $D_1$ and E of the AD converter 14 and the clock C are routed to a control circuit 18, which then produces a signal $V_1$. A voltage controlled oscillator (VCO) 20 oscillates the clock C having a frequency which is controlled by the signal $V_1$. The data signal $D_1$ is the major signal indicative of a particular one of two levels which the demodulated signal $P_1$ or $Q_1$ assumes at a sampling point of the AD converter 14 or 16 associated with the signals $P_1$ or $Q_1$. The data signal E, on the other hand, is representative of a deviation (error) of the value of the demodulated signal $P_1$ or $Q_1$ from a normal value (normal level) at the sampling point.

The control circuit 18 and the VCO 20 in combination constitute a clock synchronizing circuit which logically manipulates the data signals D1 and E outputted by the AD converter 14 for setting up clock synchronization. This clock synchroinzing circuit operates with the same principle as that of a clock synchronizing circuit which is disclosed in Papers of the 1984 National Meeting of the Communications Section of the Institute of Electronics and Communication Engineers of Japan, Fascicle 3 (1984-10), pp. 3-22.

The control circuit 18 and the VCO 20 are operated as follows.

The demodulated signal $P_1$ applied to the AD converter 14 has undergone some bandwidth limitation. Hence, when the sampling point of the AD converter 14 is deviated from the optimum one, the value of the demodulated signal is deviated from the normal value (normal level) so that the data signal E appears as an error signal. Assuming three sequential sampling points $T_{-1}$, $T_0$ and $T_1$, the point $T_{-1}$ being earliest, the control circuit 18 sees the data signal $D_1$ at the sampling points $T_{-1}$ and $T_1$ to decide the polarity of time differentiation of the demodulated signal $P_1$ at the sampling point $T_0$ and, based on the result, delivers the data signal E as a signal $V_1$ through a low pass filter either directly or after inverting the polarity of the signal E. So long as the data signal $D_1$ has the same value at the sampling points $T_{-1}$ and $T_2$, the input to the low pass filter holds the previous effective value because the time differentiation of the demodulated signal $P_1$ at the sampling point $T_0$ is a ZERO at that time and because the data signal E is not related to the advance and delay of the sampling point. Since the signal $V_1$ is an error signal which responds to any deviation in the sampling point, it is possible to adjust the phase of the clock C and, thereby, lock the sampling point of the AD converter 14 to the optimum one by controlling the output frequency of the VCO 20 by the signal $V_1$.

In this particular example, the AD converter 16 is also clocked by the VCO 20. In sometimes occurs that the clock in the demodulated signals $P_1$ and $Q_1$ become deviated in phase from each other due to incompleteness of a modulator, which produces the four-phase modulated signal $I_1$. To cope with this occurrence, another set of control circuit 18 and VCO 20 may be installed and so arranged as to prepare a clock using the data signal $D_1$ and E outputted by the AD converter 16. This exclusive clock applied to the AD converter 16 will positively maintain the sampling points of both the AD converters 14 and 17 at optimum ones.

Meanwhile, an adaptive transversal equalizer of the previously stated kind is usable to compensate for distortions due to delay and attenuation in a transmission path by automatic control and in conformity to particular conditions of the transmission path. This type of equalizer also functions to compensate for insignificant deviations of sampling point of a demodulator. An error signal for determining a tap constant of an adaptive transversal equalizer is implemented by the data signal E. As previously discussed, the problem with the use the demodulator 10 of FIG. 1 in combination with an adaptive transversal equalizer is that since both the error signal assigned to the clock synchronizing circuit of the demodulator 10 and the error signal assigned to the equalizer are implemented by the data signal E, a control loop of the demodulator and that of the equalizer affect each other to become astatic, the equalizer noticeably deteriorating the demodulation eye pattern. That is, where the prior art demodulator 10 and an adaptive transversal equalizer are used together, their associated controls often fail to converge to optimum points.

Various embodiments of a demodulator in accordance with the present invention will be described which constitute a solution to the problem discussed above.

Figure 2A:
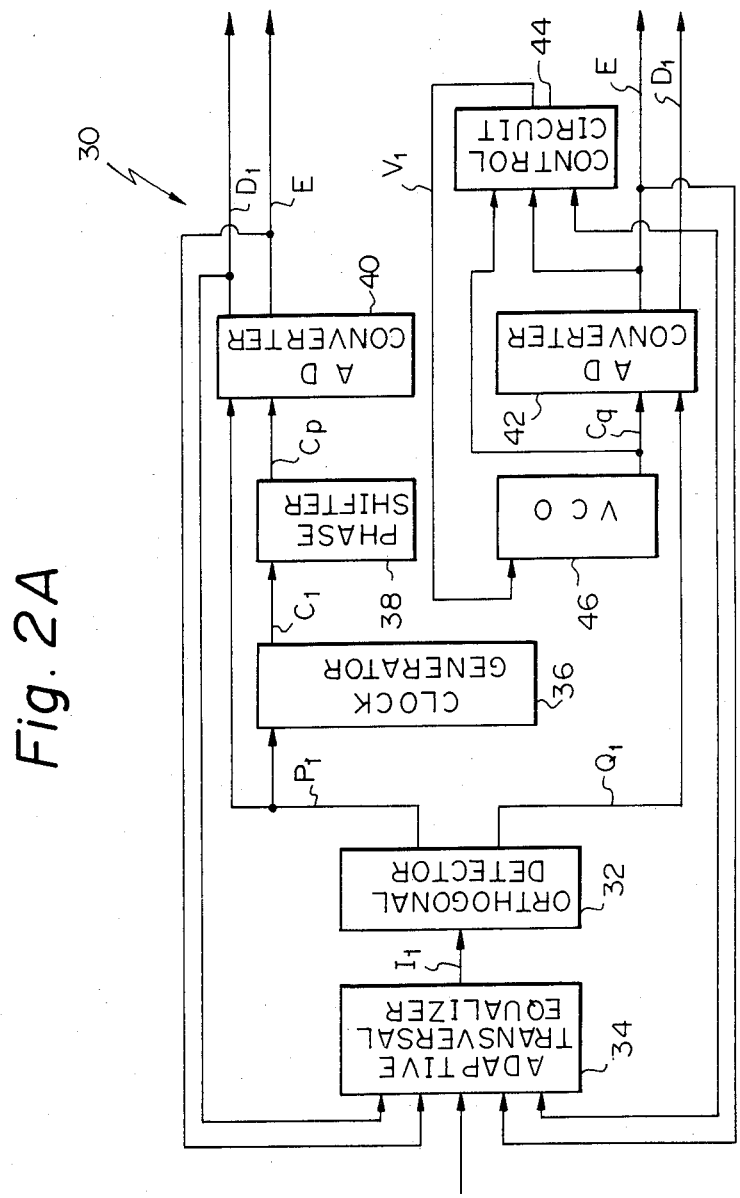
FIG. 2A is a block diagram showing a demodulator embodying the present invention.

Referring to FIG. 2A, a demodulator of the present invention is shown and generally designated by the reference numeral 30. The demodulator 30 includes an orthogonal detector 32 adapted to detect a four-phase modulated signal $I_1$, which has been equalized by an adaptive transversal equalizer 34, to produce two-level demodulated signals $P_1$ and $Q_1$. A clock generator 36 prepares a signal $C_1$ by regenerating signal components out of transition points of the demodulated signal $P_1$ which are synchronous to a clock. A phase shifter 38 shifts the signal $C_1$ to produce a clock signal $C_p$. Two-bit AD converters 40 and 42 function respectively to discriminate the demodulated signals $P_1$ and $Q_1$ responsive to the clock signal $C_p$ and a clock signal $C_q$, thereby outputting data signals $D_1$ and E. The data signals $D_1$ and E from the AD converter 42 and the clock signal $C_q$ are fed to a control circuit 44. A voltage controlled oscillator (VCO) 46 oscillates the clock $C_q$ having a frequency which is controlled by an output signal $V_1$ of the control circuit 44.

Figure 2B:
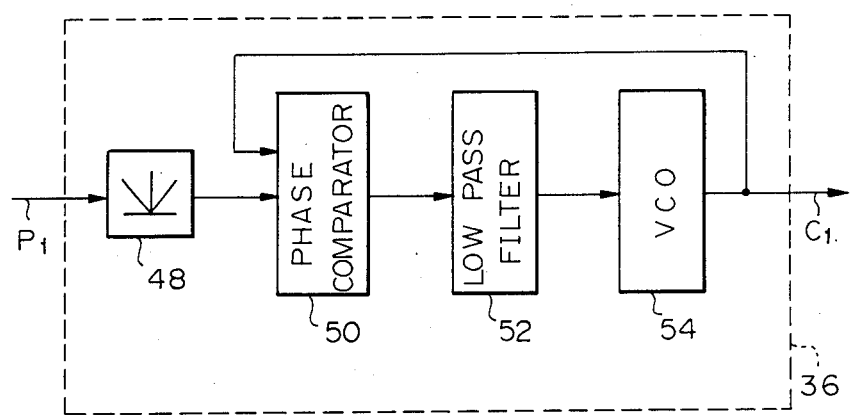
FIG. 2B is a block diagram showing details of a clock generator included in the demodulator of FIG. 2A.

As shown in detail in FIG. 2B, the clock generator 36 is made up of a full-wave rectifier 48 for rectifying the demodulated signal $P_1$, and a phase synchronizing circuit which is made up of a phase comparator 50, a low pass filter 52, and a VCO 54. The phase synchronizing circuit serves to produce the signal $C_1$ which is synchronous to a clock component contained in an output of the full-wave rectifier 48. Since the demodulated signal $P_1$, although usually void of a line spectrum of a clock component, contains signal transition points with a certain probability, it allows a clock component to develop when subject to non-linear manipulation such as full-wave rectification. For this reason, the clock generator 36 successfully regenerates the signal $C_1$ which is synchronous to the clock out of the transition points of the signal $P_1$.

In FIG. 2A, the phase shifter 38 shifts the phase of the signal $C_1$ such that the phase of the clock $C_p$ is so adjuted as to control the sampling point of the AD converter 40 to an optimum one. Although the phases of the signals $C_1$ and $C_p$ may vary due to temperature variation and aging to in turn cause deviation in the sampling point of the AD converter 40 from the optimum one, the influence of the deviation is compensated for by the adaptive transversal equalizer 34 and, hence, the sampling point of the AD converter 40 may safely be regarded as being optimally controlled. The control circuit 44 and the VCO 46 individually operate in essentially the same manner as those of the prior art demodulator so as to optimally control the sampling point of the AD converter 42.

The equalizer 34 uses the two data signals outputted by the AD converters 40 and 42 as error signals. The control circuit 44 adapted to control the clock $C_q$ which is fed to the AD converter 42 also uses the data signal E as an error signal. However, in this particular embodiment, the clock generator 36 does not use the data signal E as an error signal and, instead, regenerates the clock $C_p$ for the AD converter 40 out of the transition points of the demodulated signal $P_1$. In this construction, even if the adaptive transversal equalizer 34 is controlled by the data signal E to vary the waveform of the demodulated signal $P_1$, the phase of the clock $C_p$ is prevented from immediately responding to it and remains substantially constant. As as result, at a point where the error of the data signal E becomes zero, the control over the equalizer 34 is terminated and so is the variation in the waveform of the demodulated signal $P_1$, the loop thus being allowed to converge.

Meanwhile, the phase of the clock $C_q$ tends to vary and run out of control responsive to the variation in the waveform of the demodulated signal $Q_1$ which has been controlled by the adaptive transversal equalizer 34. However, since the phase of the clock $C_p$ is constant as previously mentioned, the error of the data signal E ouptutted by the AD converter 40 at that time is of the opposite polarity so that the clock $C_q$ is safeguarded against runaway. That is, at the point where the error of the sum of the two data signals E becomes zero, the loop of the equalizer 34 is interrupted with the result that the variation in the waveform of the demodulated signal $Q_1$ and, therefore, the variation in the phase of the VCO 46 is terminated.

As described above, the construction shown in FIG. 2A allows both the adaptive transversal equalizer 34 and the demodulator 30 to operate each in a normal condition.

Figure 3:
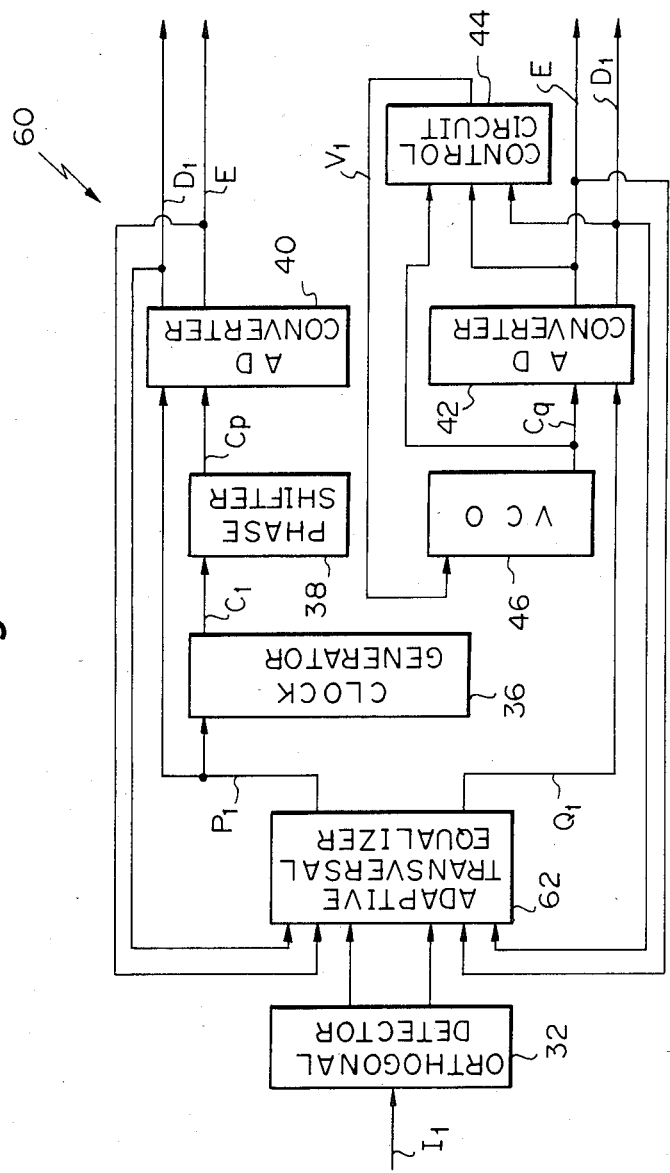
FIGS. 3-8 are block diagrams each showing another embodiment of the present invention.

Referring to FIG. 3, another embodiment of the present invention is shown in a block diagram. In FIG. 3, the same structural elements and signals as those shown in FIGS. 2A and 2B are designated by like reference numerals and symbols. The demodulator 60 shown in FIG. 3 is exactly the same in construction and operation as the demodulator 30 of FIGS. 2A and 2B except that it has an adaptive transversal equalizer 62 intervening between the orthogonal detector 32 and the AD converters 40 and 42, the equalizer 62 being operable in the baseband. In FIG. 3, while the clock generator 36 is shown as being supplied with the demodulated signal $P_1$ which has been equalized by the equalizer 62, its operation will not be effected even if the signal $P_1$ is replaced with the signal which has not been equalized.

Figure 4:
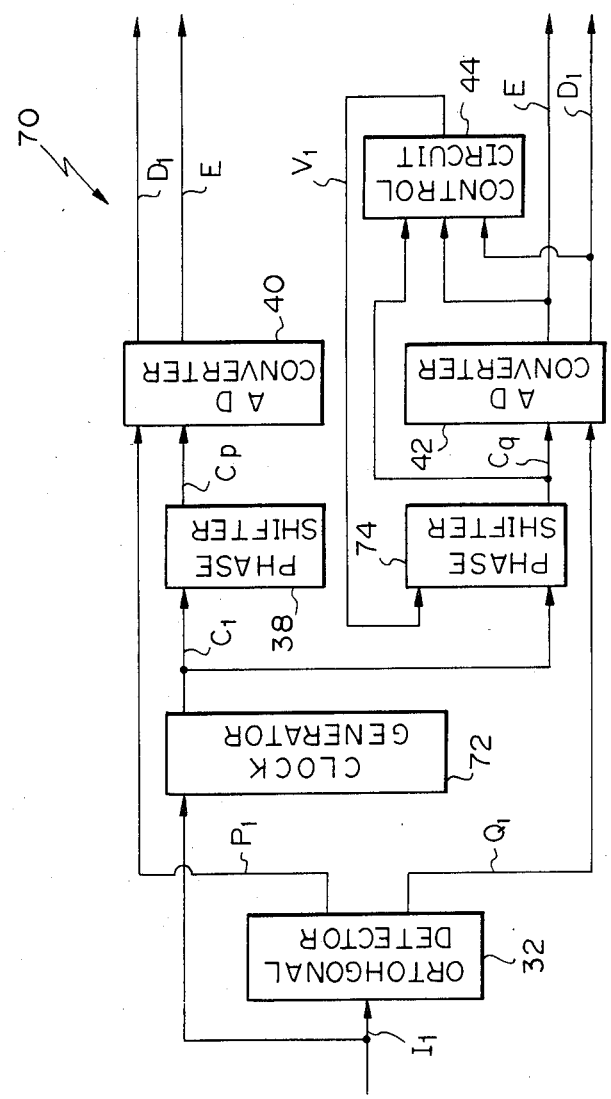

Referring to FIG. 4, another embodiment of the present invention is shown in a block diagram. A demodulator 70 of FIG. 4, too, is used in combination with an adaptive transversal equalizer, not shown. This particular embodiment differs from that of FIG. 2A in that it includes a clock generator 72 instead of the clock generator 36 and a phase shifter 74 instead of the VCO 46. Specifically, the clock generator 72 is configured by replacing the full-wave rectifier 48 of the clock generator 36 of FIG. 2B with a circuit which subjects the four-phase modulated signal $I_1$ to non-linear manipulation such as envelope detection. Inasmuch as the four-phase modulated signal, too, yields clock components when subjected to non-linear manipulation, the clock generator 72 is capable of regenerating the signal $C_1$ which is synchronous to a clock out of the transition points of the signal $I_1$.

The clock signal $C_1$ is applied to the phase shifter 38 to become a clock signal $C_p$ as in the embodiment of FIG. 2A and, in addition, applied to a phase shifter 74 to become a clock signal $C_q$. The value of phase shift effected by the phase shifter 74 is controlled by the signal $V_1$, so that the phase of the clock $C_q$ is controlled to a value which sets up an optimum sampling point in the AD converter 42. Again, both the demodulator 70 and the adaptive transversal equalizer are operable each in a normal condition.

Figure 5:
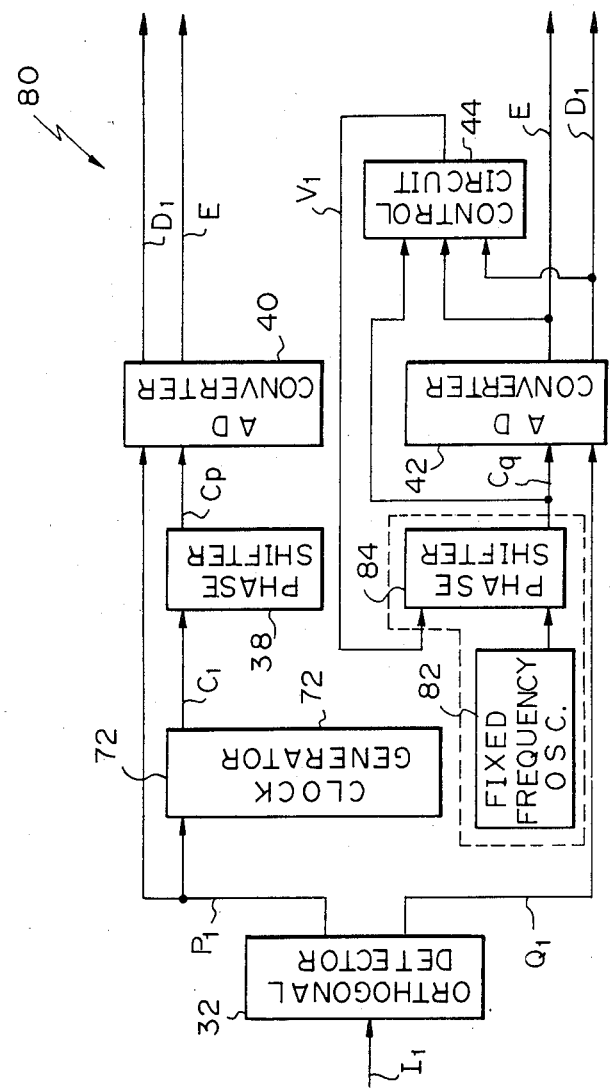

Referring to FIG. 5, a demodulator in accordance with another embodiment of the present invention is shown and generally designated by the reference numeral 80. The demodulator 80, too, is used in combination with an adaptive transversal equalizer, not shown. This particular embodiment is essentially similar to that of FIG. 2A except that the VCO 46 is replaced with a fixed frequency oscillator 82 and a phase shifter 84. The output frequency of the fixed frequency oscillator 82 is substantially equal to the clock frequency. The phase shifter 84 is an infinite phase shifter whose phase shift value increases or decreases in proportion to time, the variation ratio of the phase shift value with respect to time being controlled by the signal $V_1$. Since the output of the oscillator 82 is controlled in phase by the phase shifter 84 whose variation ratio, as stated above, is controlled by the signal $V_1$, the phase of the clock signal $C_q$ is controlled to a particular value which makes the sampling point of the AD converter 42 optimum. The rest of the construction shown in FIG. 5 is exactly the same as the construction shown in FIG. 2A. It will therefore be seen that the embodiment of FIG. 5 is as effective as the embodiment of FIG. 2A concerning the control over the adaptive transversal equalizer and that over the sampling points of the AD converters 40 and 42.

Figure 6:
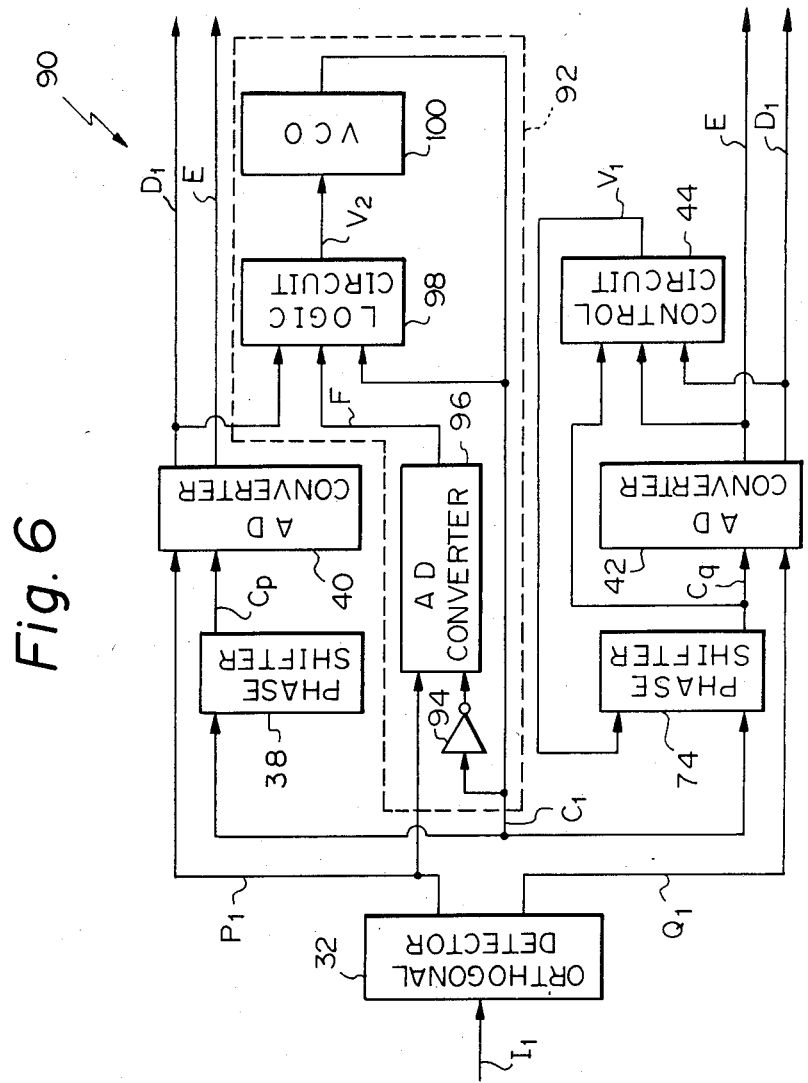

Referring to FIG. 6, another embodiment of the present invention is shown in a block diagram. In this particular embodiment, too, a demodulator 90 is used in combination with an adaptive transversal equalizer, not shown. The demodulator 90 is distinguished from the demodulator 30 of FIG. 2 by a clock generator 92 and a phase shifter 74 which are installed in place of the clock generator 36 and the VCO 46 of the latter. As shown, the clock generator 92 is made up of an inverter 94 for inverting the polarity of the signal $C_1$, a one-bit AD converter 96 adapted to discriminate the demodulated signal $P_1$ responsive to an output of the inverter 94 to thereby produce a data signal F, a logic circuit 98 which produces a signal $V_2$ responsive to the data signal $D_1$ outputted by the AD converter 40, the data signal F, and the signal $C_1$ and a VCO 100 which produces the signal $C_1$ having a frequency which is controlled by the signal $V_2$.

The phase shift value associated with the phase shifter 38 is controlled, along with the polarity inversion by the inverter 94, such that when the clock $C_p$ appearing at the input terminal of the AD converter 40 is at times $T_0$ and $T_1$, the output of the inverter 94 appearing at the input terminal of the AD converter 96 is at a time $(T_0+T_1)/2$. Hence, the clock $C_p$ at the input terminal of the AD converter 40 and the output of the inverter 94 at the input terminal of the AD converter 94 are opposite in phase to each other.

The transition point of the demodulated signal $P_1$ is positioned intermediate between the optimum sampling points of the AD converter 40. Therefore, assuming that the sampling points of the AD converter 40 are optimumly timed, if the clock $C_p$ is at the times $T_0$ and $T_1$, the transition point is at the time $(T_0+T_1)/2$ and this time is the sampling point of the AD converter 96. At the the transition point, the demodulated signal $P_1$ becomes zero level. In this case, therefore the data signal F becomes a ONE and a ZERO with the same probability at the transition point of the demodulated signal $P_1$. If the output of the inverter 94 is advanced (or delayed) with respect to the transition point and the polarity of the time differentiation of the demodulated signal $P_1$ at the transition point is positive in polarity, the value of the signal $P_1$ at the sampling point of the AD converter 96 is negative (or positive) so that the data signal F is a ZERO (or a ONE). If the polarity is negative, the above-stated relationship between the advance/delay of the output of the inverter 94 with respect to the transition point and the value of the data signal F will be inverted. The logic circuit 98 discriminates the polarity of time differentiation of the demodulated singal $P_1$ at the transition point referenceing the data signal $D_1$ which is associated with the sampling points of the AD converter 40 before and after the transition point. If the polarity is positive, the logic circuit 98 delivers the data signal F as the signal $V_2$ in the same phase via a low pass filter; if it is negative, the circuit 98 delivers the data signal F after inverting the phase of the signal F. It follows that the input to the low pass filter is a ONE when the output of the inverter 94 is and a ONE if it is delayed.

As stated above, the signal $V_2$ serves as an error signal which responds to any deviation in the output of the inverter 94 from the transition point. Applied to the VCO 100, the signal $V_2$ controls the output of the VCO 100, i.e., $C_1$ such that the output of the inverter 94 is locked at the transition point , i.e., time $(T_0+T_1)/2$, thereby synchronizing the signal $C_1$ to the clock. In short, the clock generator 92 shares the same function as the clock generator 36 of FIG. 2A in that it regenerates a signal $C_1$ which is synchronous to the demodulated signal $P_1$ out of the transition points of the demodulated signal $P_1$. Concerning the clock signal $C_q$, it is controlled in exactly the same manner as the clock signal $C_q$ which is shown in FIG. 4. Since the clock generator 92 regenerates the signal $C_1$ synchronous to the clock out of the transition points of the demodulated signal $P_1$ and the phase of the signal $C_1$ is shifted by the phase shifter 38 to become the clock signal $C_p$, the clock signal $C_p$ maintains a substantially constant phase despite the variation in the waveform of the signal $P_1$ which may result from the control of an adaptive transversal equalizer. Hence, the demodulator 90 shown in FIG. 6 and an adaptive transversal equalizer used therewith are each operable in a normal manner.

Figure 7:
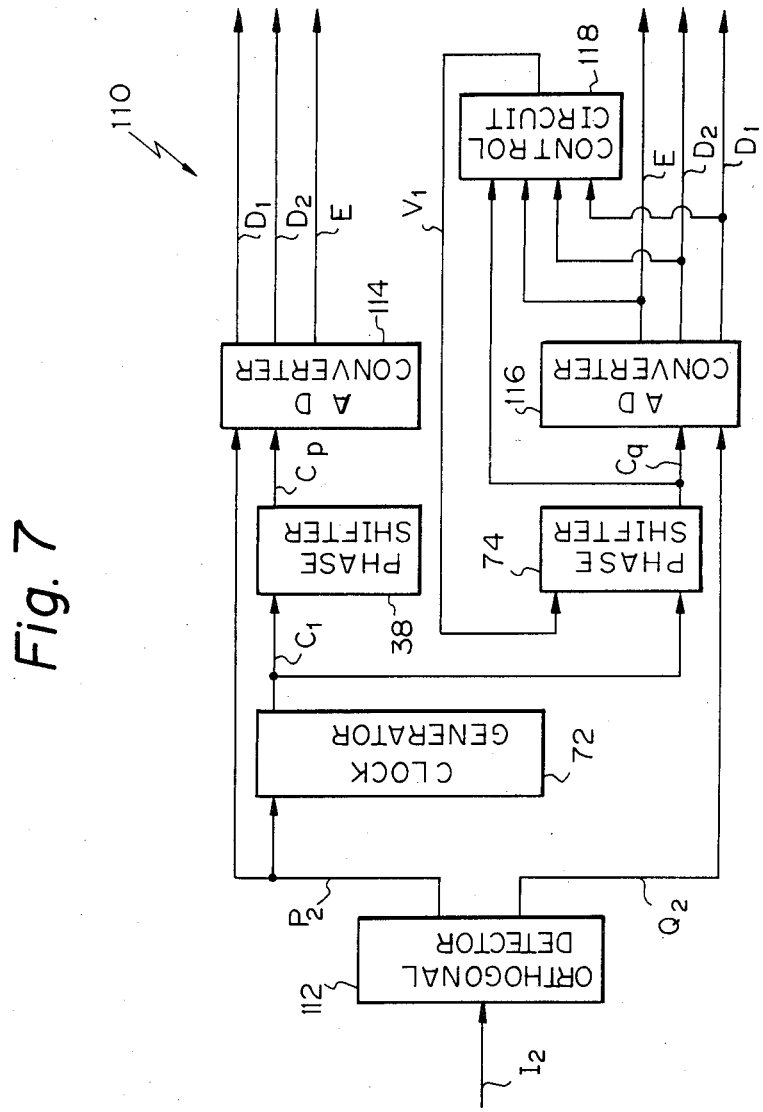

Referring to FIG. 7, another embodiment of the present invention is shown. A demodulator 110 in accordance with this particular embodiment is used together with an adaptive transversal equalizer, not shown, and constructed to demodulate a sixteen-level QAM signal $I_2$. As shown, the demodulator 110 comprises an orthogonal detector 112 for detecting the sixteen-level QAM signal $I_2$ to produce four-level demodulated signals $P_2$ and $Q_2$, the clock generator 72 for regenerating a signal which is synchronous to the clock out of the transition points of the signal $P_2$ to deliver it as the clock $C_1$, the phase shifter 38 for shifting the phase of the signal $C_1$ to provide the clock $C_p$, three-bit AD converters 114 and 116 adapted respectively to discriminate the signals $P_2$ and $Q_2$ responsive to the clocks $C_p$ and $C_q$ associated therewith to produce data signals $D_1$, $D_2$ and E each, a control circuit 118 gating the data signals $D_1$, $D_2$ and E outputted by the AD converter 116 and the clock $C_q$ to generate the signal $V_1$, and the phase shifter 74 for shifting the phase of the signal $C_1$ under the control of the signal $V_1$ to provide the clock $C_q$.

In the illustrative embodiment, the clock $C_p$ is controlled in exactly the same manner as the clock $C_p$ of the embodiment of FIG. 2A. Therefore, although the sampling points of the AD converter 114 may be shifted due to the use of an adaptive transversal equalizer, the demodulator 110 is not affected at all and, in addition, the equalizer is controlled optimally. The controller 118 shares the same principle of operation as the controller 44 of FIG. 3. Specifically, it operates in exactly the same manner as the controller 44 except that the polarity of time differentiation of the signal $Q_2$ at the sampling point $T_0$ is determined by the use of the data signals $D_1$ and $D_2$ which are outputted by the AD converter 42 at the sampling points $T_{-1}$ and $T_1$. In this construction, like that of FIG. 3, sampling points of the AD converter 116 are also controlled in an optimum fashion.

Figure 8:
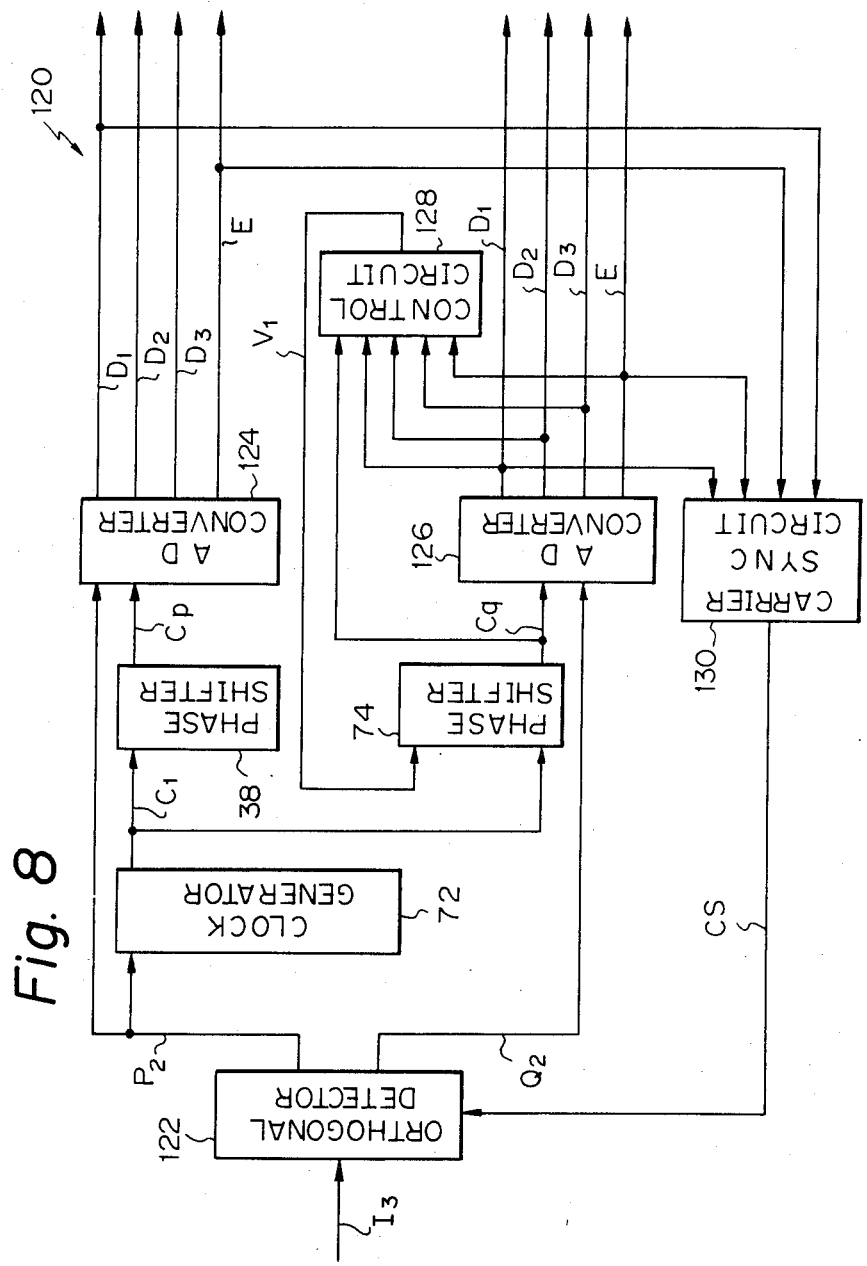

Referring to FIG. 8, still another embodiment of the present invention is shown. In this particular embodiment, a demodulator 120 is combined with an adaptive transversal equalizer, not shown, and used to demodulate a sixty-four-level QAM signal $I_3$. As shown, the demodulator 120 comprises an orthogonal detector 122 for detecting the sixty-four-level QAM signal $I_3$ to produce four-level demodulated signals $P_2$ and $Q_2$, the clock generator 72 for regenerating a signal which is synchronous to the clock out of the transition points of the signal $P_2$ and delivering it as the clock $C_1$, the phase shifter 38 for shifting the phase of the clock $C_1$ to produce the clock $C_p$, four-bit AD converters 124 and 126 adapted respectively to discriminate the signals $P_2$ and $Q_2$ responsive to the clocks $C_p$ and $C_q$ to deliver data signals $D_1$, $D_2$, $D_3$ and E each, a control circuit 128 gating the data signals $D_1$, $D_2$, $D_3$ and E outputted y the AD converter 126 to generate the signal $V_1$, and the phase shifter 74 for shifting the phase of the signal $C_1$ under the control of the signal $V_1$ to provide the clock $C_q$.

Figure 9:
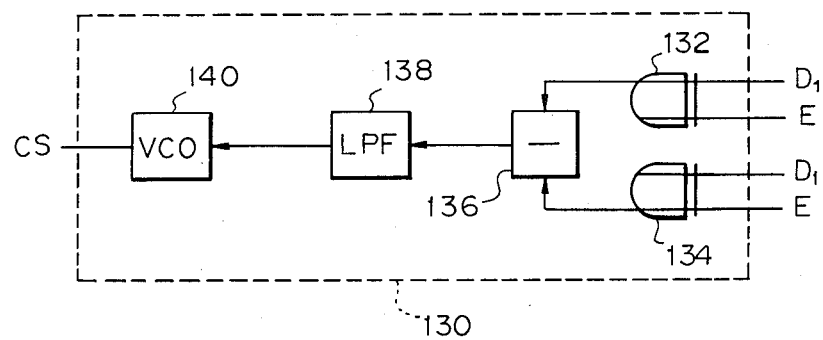
FIG. 9 is a block diagram of a carrier synchronizing circuit included in the demodulator of FIG. 8.

In this particular embodiment, the demodulator 120 further comprises a carrier synchronizing circuit which gates the data signals $D_1$ and E from the AD converters 124 and 126 to produce a carrier synchronizing signal CS. As shown in detail in FIG. 9, the carrier synchronizing circuit 130 is made up of an exclusive-OR gate 132 having two input terminals to which the data signal $D_1$ from the AD converter 128 and the data signal E from the AD converter 124 respectively are applied, an exclusive-OR gate 134 having two input terminals to which the data signal $D_1$ from the AD converter 124 and the data signal E from the AD converter 126 respectively are applied, a subtractor 136 to which output signals of the exclusive-OR gates 132 and 134 are delivered, a low pass filter 138 to which an ouput of the subtractor 136 is applied, and a VCO 140 controlled by an output of the filter 138 for generating the carrier synchronizing singal CS. The carrier synchronizing circuit per ce is well known in the art and, therefore, a detailed description thereof will be omitted.

Figure 10:
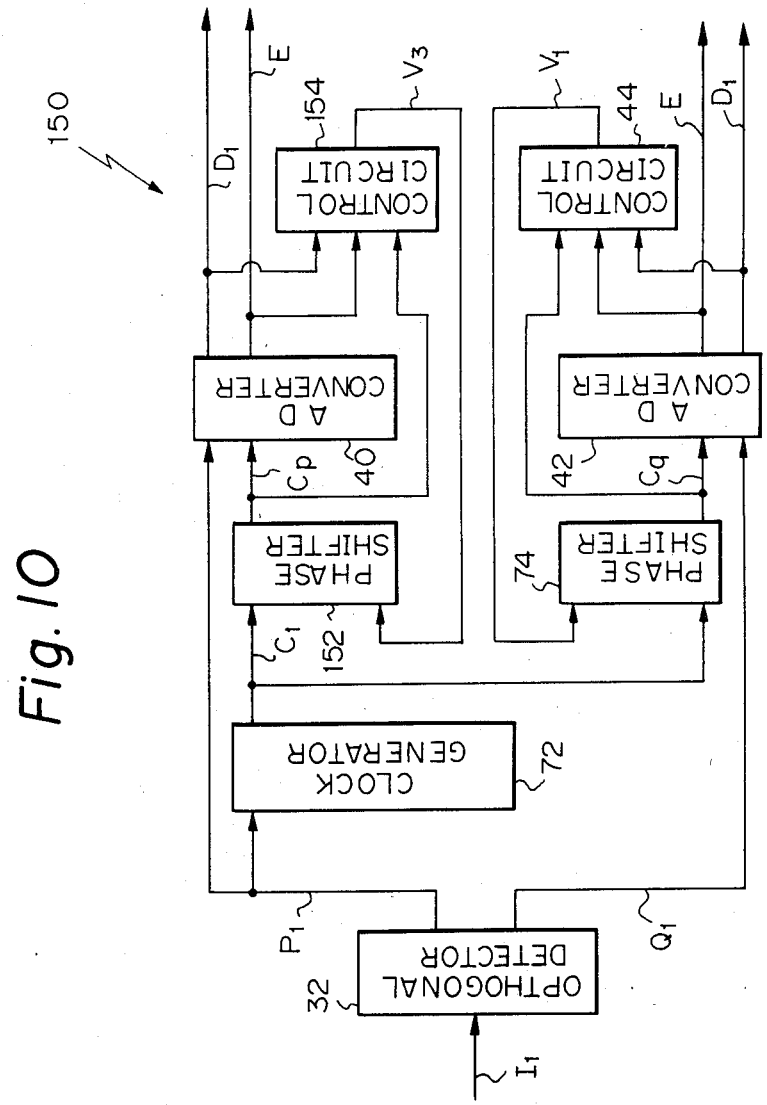
FIG. 10 is a block diagram showing a further embodiment of the present invention.

Referring to FIG. 10, a further embodiment of the present invention is shown. A demodulator 150 in this particular embodiment is applicable to a case wherein an adaptive transversal equalizer is not used. The demodulator 150 is constructed by replacing the VCO 46 and the phase shifter 38 of the embodiment of FIG. 2A with the phase shifter 74 and another phase shifter 152 which is identical in function with the phase shifter 74, and adding a control circuit 154 for controlling the phase shift value of the phase shifter 152. The control circuit 154 functions in the same manner as the control circuit 44. The control circuit 154 and the phase shifter 152 cooperate to optimumly controlthe sampling points of the AD converter 40, while the control circuit 44 and the phase shifter 74 cooperate to optimally control the sampling points of the AD converter 42. As previously discussed in relation to the prior art demodulator, where the demodulator 150 of FIG. 10 is used in combination with an adaptive transversal equalizer, controls over both of them sometimes become astatic. Nevertheless, if the signal $V_3$ which is applied to the phase shifter 152 is replaced with a fixed voltage signal, the phase shifter 152 will share the same function as the phase shifter 38 of FIG. 2A and allow the demodulator 150 to operate in combination with an adaptive transversal equalizer without falling in astatic conditions.

In the aspect of production, only demodulators having the particular configuration of FIG. 7 may be produced with no regard to the joint/non-joint operation with an adaptive transversal equalizer and, afterwards, modified to any of the other various configurations shown and described at the time of installation. Since such modifications are very easy, standardizaton of modulators is enhanced to promote cost-effective production.

Further, in any of the embodiments shown in FIGS. 2A and 2B, 3, 4, 5, 6 and 7, the phase shifter 38 may be replaced with a phase shifter whose phase shift value is controlled by a voltage signal, and a control circuit for generating the voltage signal may be added. This will also contribute a great deal to the standardization of demodulators.

While the present invention has been shown and described in relation to a four-phase modulated signal, a sixteen-level QAM signal and a sixty-four-level QAM signal, it is similarly applicable to QAM signals having more than sixty-four-levels and having multiple irregularly spaced levels, e.g. an eight-phase modulated signal.

In summary, it will be seen that the present invention provides a demodulator which is usable in combination with an adaptive transversal equalizer to promote quality transmission of a large amount of data despite a limited occupied bandwidth of a carrier passband, while compensating for distortions due to delay and attenuation which are inherent in a transmission path. In addition, the present invention facilitates standardization of demodulators and, thereby, cut-down in the cost of demodulators.

Various modifications will become possible for those skilled in the art after receiving the teachings of the present disclosure without departing from the scope thereof.

What is claimed is:

1. A demodulator for demodulating a quadrature-amplitude modulated signal, comprising:
   an orthogonal detector for detecting the quadrature-amplitude modulated signal to produce first and second demodulated signals;
   a first clock generator for regenerating a signal which is synchronous to a clock out of transition points of the quadrature-amplitude modulated signal or the first demodulated signal;
   a first phase shifter for shifting a phase of said regenerated signal of said first clock generator to produce a first clock signal;
   a first analog-to-digital converter for discriminating the first demodulated signal responsive to the first clock signal to produce a first group of data signals;
   a second clock generator for producing a second clock signal, a frequency or a phase of which is controlled by a control signal;
   a second analog-to-ditigal converter for discriminating the second demodulated signal responive to the second clock signal to produce a second group of data signals; and
   a control circuit for gating and logically processing the second group of data signals to produce the control signal.

2. A demodulator as claimed in claim 1, wherein the second clock generator comprises a second phase shifter which shifts said phase of said regenerated signal of the first clock generator.

3. A demodulator as claimed in claim 1, wherein the second clock generator comprises a fixed frequency oscillator and a third phase shifter.

4. A demodulator as claimed in claim 1, wherein the first phase shifter is controlled by a signal which is provided by logically processing the first group of data signals.

5. A demodulator as claimed in claim 1, further comprising an adaptive transversal equalizer provided preceeding the orthogonal detector for equalizing the quadrature-amplitude modulated signal in response to the first and second groups of data signals.

6. A demodulator as claimed in claim 1, further comprising an adaptive transversal equalizer provided between the orthogonal detector and the first and second analog-to-digital converters for equalizing the first and second demodulated signals in response to the first and second groups of data signals.

7. A demodulator as claimed in claim 1, wherein the first clock generator comprises a full-wave rectifier for rectifying the first demodulated signal, a voltage controlled oscillator responsive to a seoncd control signal for providing said regenerated signal, a phase comparator for phase-comparing the regenerated signal and the output signal of the full-wave rectifier, and a low-pass filter responsive to the output of the phase comparator for providing said second control signal.

8. A demodulator as claimed in claim 1, further comprising a carrier synchronizing circuit responsive to one of the first and second groups of data signals for providing a carrier wave for the orthogonal detector.

* * * * *

UNITED STATES PATENT AND TRADEMARK OFFICE
CERTIFICATE OF CORRECTION

PATENT NO. : 4,631,488
DATED : December 23, 1986
INVENTOR(S) : Yasuharu Yoshida

It is certified that error appears in the above-identified patent and that said Letters Patent is hereby corrected as shown below:

Column 2, line 31, delete "dealy" insert --delay--.
Column 2, Heading "BREIF DESCRIPTION" insert --BRIEF--.
Column 3, line 54, delete "In" insert --It--.
Column 3, line 55, delete "clock" insert --clocks--.
Column 4, line 54, delete "subject" insert --subjected--.
Column 4, lines 60-61, delete "adjuted" insert --adjusted--.
Column 6, line 58, between "$C_1$" and "and" insert --,--.
Column 7, line 25, delete "singal" insert --signal--.
Column 9, line 50, after "and" insert --QAM signals of the kind which provide demodulated signals--.

Signed and Sealed this

Eighth Day of September, 1987

Attest:

DONALD J. QUIGG

Attesting Officer

Commissioner of Patents and Trademarks